June 12, 1945.  G. A. TINNERMAN  2,378,257
FASTENING DEVICE
Filed Nov. 26, 1943

INVENTOR.
GEORGE A. TINNERMAN
BY
Bates, Teare & McBean
ATTORNEYS

Patented June 12, 1945

2,378,257

UNITED STATES PATENT OFFICE 2,378,257

FASTENING DEVICE

George A. Tinnerman, Cleveland, Ohio, assignor to Tinnerman Products, Inc., Cleveland, Ohio, a corporation of Ohio Application November 26, 1943, Serial No. 511,769

3 Claims. (Cl. 85—36)

This invention relates to fastening devices and particularly to sheet metal fasteners which are adapted for use in holding parts together through the medium of a threaded member.

Where it is desired to make a flush mounting between a threaded member and a sheet metal plate, and where it is desired to fasten an article to the plate on the rearward side thereof, by means of a sheet metal device having a thread-engaging portion thereon, considerable difficulty has been experienced in obtaining an even bearing surface against which the thread engaging portion could be drawn without impairing the extent of flexibility desired in the thread engaging portion, and without interfering with the stability of the device during the tightening operation.

An object of the present invention is to make a fastening device which is well suited for accomplishing a flush mounting between the head of a threaded member and a sheet metal plate, and at the same time for securing the attachment to the plate of an article that is associated therewith. An additional object is to solve the problem presented by means of a fastener that can be economically made and that can be readily attached to the part to be fastened and held in self-sustaining bolt or screw receiving position.

Figure 1:
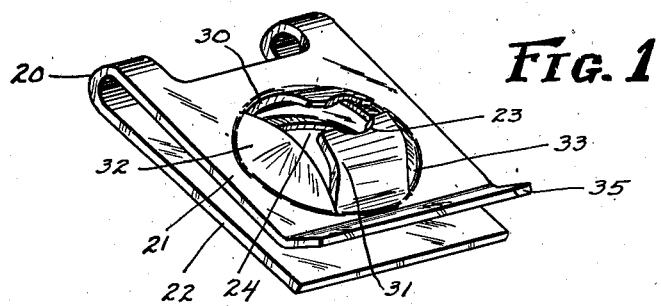
Figure 2:
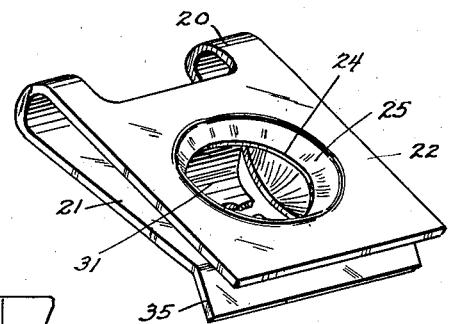
Figure 3:
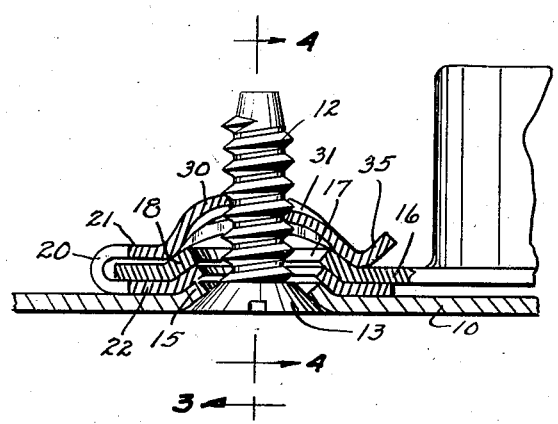
Figure 4:
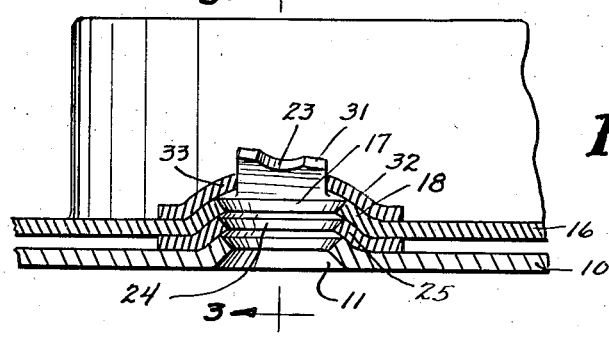

In the drawing, Fig. 1 shows a perspective view of a fastening member embodying the present invention as viewed from the top of the member; Fig. 2 is a perspective view of the fastener, as viewed from the bottom thereof; Fig. 3 is a section taken on the line 3—3 in Fig. 4 and showing the fastener in assembled position on the part to be joined, and Fig. 4 is a section taken on the line 4—4 of Fig. 3.

The present invention is illustrated in connection with a sheet metal plate 10 which has an opening 11 therein for receiving the shank 12 of a threaded member which has a frusto-conical head 13. The region on the plate surrounding the opening 11 is countersunk, as at 15, so that a flush mounting of the screw head with respect to the plate can be obtained.

The part to be joined to the plate, indicated at 16, has a shank receiving opening 17 therein, and has the region surrounding the opening countersunk, as at 18, so as to be complementary to the countersunk portion on the plate 10.

To hold the part 16 onto the plate 10, I provide a screw or bolt receiving structure in the form of a sheet metal fastener that embodies a one-piece sheet metal strip bent intermediately, as at 20, to provide arms 21 and 22 which extend in the same general dirction, and which are sufficiently close together to fit tightly upon the part 16 which is arranged to be interposed therebetween. The arms 21 and 22 have registering bolt receiving openings 23 and 24 which are adapted to be in registration also with the openings in the parts 10 and 16 when the assembly is in bolt receiving position. The region surrounding the opening 24 on the arm 22 is countersunk, as at 25, and such countersunk portion is complementary to that on the parts 10 and 16, respectively, whereby there is a nesting relationship therebetween, whenever the parts are brought together into bolt receiving position.

The arm 21 of the fastener carries thread engaging means, preferably in the form of tongues 30 and 31 which are struck from the arm and which have their end portions tilted with respect to each other to conform to the helix of the thread on the bolt with which the fastener is intended to be used. That portion of the arm on each side of the thread-engaging portion is extended upwardly to substantially a spherical segment, as at 32, and 33, to make a snug fit with the countersunk portion 18 on the part 16. The arm may also have the free end 35 thereof bent upwardly so as to function as a guide for facilitating application of the fastener to the part 16.

A fastener made in accordance with the present invention will not only be self-sustaining in bolt receiving position, but will nest satisfactorily with countersunk portions on two parts to be joined. This assembly permits the accomplishment of a flush mounting on one of the parts, and enables the attachment to be quickly made. In addition, the assembly maintains the bolt receiving member in position to facilitate reception of the shank of the threaded member, and the use of a power-operated screw driver for turning and locking the threaded member into place.

I claim:

1. A flush mounting assembly for a threaded member, comprising in combination, a plate having an aperture for receiving the shank of a threaded member and having the portion thereof surrounding the aperture countersunk sufficiently to receive the head of said member and to make a flush mounting therewith, a part to be joined to said plate, said part having an opening in registration with the aperture in the plate and having the region surrounding the opening countersunk complementary to that of the first-mentioned countersunk portion, a U-shaped sheet metal fastener having registering openings in the arms thereof and adapted to receive said part therebetween, one of said arms having the region surrounding the opening therein countersunk complementary to that of the interposed part and the plate, and the other of said arms having a pair of opposed tongues partially severed from the countersunk portion thereof and bent outwardly beyond the remainder of such portion, such remainder on each side of the thread-engaging portion being adapted to nest with the countersunk portion of the other part.

2. A flush mounting assembly for a threaded member comprising in combination, a plate and a part to be joined, each having openings therein adapted to be aligned for receiving the shank of a threaded member and each having a countersunk portion adjacent the opening, and a sheet metal clip having one portion thereof interposed between the parts to be joined and having another portion adapted to be superimposed on one of the parts, each of said clip portions having an opening in registration with the opening of the part and each having countersunk portions surrounding the opening, whereby the parts and clips are nested sufficiently to retain the clip in bolt-receiving positions on said part, and one of said parts having a thread-engaging portion formed thereon, the thread-engaging portion embodying a pair of opposed tongues that extend outwardly beyond the remainder of that countersunk portion and are adapted to be moved with respect to such remainder for providing a yieldable engagement with the shank of the threaded member.

3. A fastening device comprising a strip of sheet metal bent intermediately to provide two arms, said arms having aligned openings therein for receiving the shank of a threaded fastener, each arm having a countersunk portion extending in the same general direction, the countersunk portion on one arm extending completely around the opening, and that on the other arm extending partially as dome segments along opposite sides of the opening, the last-mentioned arm having a thread-engaging portion formed integrally therewith and disposed between the countersunk portions thereon, and projecting outwardly beyond such portions.

GEORGE A. TINNERMAN.